United States Patent [19]
Leitz et al.

[11] Patent Number: 5,605,963
[45] Date of Patent: Feb. 25, 1997

[54] ABS POLYMER COMPOSITIONS HAVING A UNIFORM MATT SURFACE

[75] Inventors: Edgar Leitz; Herbert Eichenauer, both of Dormagen; Karl-Erwin Piejko, Bergisch Gladbach; Dieter Wittmann, Leverkusen; Ekkehard Frohberg, Köln, all of Germany

[73] Assignee: Bayer Aktiengesellschaft, Leverkusen, Germany

[21] Appl. No.: 383,832

[22] Filed: Feb. 6, 1995

[30] Foreign Application Priority Data

Feb. 15, 1994 [DE] Germany .................. 44 04 749.5

[51] Int. Cl.⁶ .................................................. C08L 51/04
[52] U.S. Cl. ...................... 525/71; 525/73; 525/84; 525/86
[58] Field of Search ..................... 525/71, 86; 524/504

[56] References Cited

U.S. PATENT DOCUMENTS

| | | | |
|---|---|---|---|
| 3,551,370 | 12/1970 | Dalton | 523/335 |
| 3,558,541 | 1/1971 | Dalton | 523/335 |
| 4,233,409 | 11/1980 | Bulkley | 525/71 |
| 4,785,051 | 11/1988 | Henton | 525/71 |

OTHER PUBLICATIONS

Derwent Database, Acrylonitrile–Butadiene–Styrene Type Polymer, JP–1–51–006–248, Jan. 19, 1976.

*Primary Examiner*—Mark Warzel
*Attorney, Agent, or Firm*—Connolly & Hutz

[57] ABSTRACT

ABS polymer compositions consisting of

A) 5 to 80 parts by weight of at least one ABS polymer prepared by mass polymerization or solution polymerization, having rubber particles with an average particle diameter of from 800 to 15,000 nm and a rubber content of from 1 to 20% by weight, B) 1 to 50 parts by weight of at least one ABS polymer prepared by emulsion polymerization, having an average particle diameter of from 50 to 500 nm and a rubber content of from 20 to 80% by weight, C) 0 to 70 parts by weight of at least one thermoplastic vinyl resin prepared by radical polymerization of at least two monomer components selected from styrene, α-methylstyrene, methyl methacrylate, acrylonitrile, N-phenylmaleimide and D) 0.5 to 10 parts by weight of at least one polybutadiene prepared by emulsion polymerization, having an average particle diameter $d_{50}$ in the latex form of from 80 to 500 nm and a gel content of from 10 to 95% by weight.

3 Claims, No Drawings

ABS POLYMER COMPOSITIONS HAVING A UNIFORM MATT SURFACE

The invention relates to ABS pollers which can be easily prepared, having a uniform matt surface and at the same time high toughness and good processability.

ABS polymers having a matt surface are known and are described in, for example, EP-A 139 271, EP-A 154 244, EP-A 154 804, EP-A 164 048, EP-A 196 041, EP-A 295 517, EP-A 306 103, EP-A 570 773 and DE-A 3 340 591.

A disadvantage of the said matt ABS systems is, however, that uniform matt surfaces cannot be obtained in the process of injection moulding and the polymers have only average toughness values and do not as a rule have particularly good thermoplastic flow properties. The matting agent must moreover be used in relatively high concentrations or the matting be carried out by the incorporation of monomers containing functional or reactive groups (for example, acidic or basic groups, epoxy groups), which requires a relatively complicated preparation and whereby opportunities for mixing with unmodified ABS polymers, for example, in plastics recycling or in mixing with polymers which are sensitive to acids or bases (for example, polycarbonate) are severely limited.

There was therefore a requirement for ABS polymers which result in moulded parts having matt surfaces and which consist solely of the structural components classically employed for the preparation of ABS polymers.

It has now been found that such ABS polymers can be obtained from specific individual components if precisely defined boundary conditions are maintained.

The present invention provides ABS polymer compositions consisting of:

A) 5 to 80 parts by weight, preferably 10 to 60 parts by weight and particularly preferred 15 to 55 parts by weight, of at least one ABS polymer prepared by mass polymerisation or solution polymerisation, having rubber particles with an average particle diameter of from 800 to 15,000 nm, preferably from 1,000 to 10,000 nm and particularly preferred from 1,200 to 5,000 nm and a rubber content of from 1 to 20% by weight, preferably from 5 to 15% by weight and particularly preferred from 7.5 to 12.5% by weight, B) 1 to 50 parts by weight, preferably 5 to 40 parts by weight and particularly preferred 10 to 35 parts by weight, of at least one ABS polymer prepared by emulsion polymerisation, having an average particle diameter of from 50 to 500 nm, preferably from 100 to 450 nm and particularly preferred from 200 to 400 nm, and a rubber content of from 20 to 80% by weight, preferably from 30 to 70% by weight and particularly preferred from 35 to 65% by weight, C) 0 to 70 parts by weight, preferably 5 to 60 parts by weight and particularly preferred 10 to 50 parts by weight, of at least one thermoplastic vinyl resin prepared by radical polymerisation of at least two monomer components selected from styrene, α-methylstyrene, methyl methacrylate, acrylonitrile, N-phenylmaleimide and D) 0.5 to 10 parts by weight, preferably 0.75 to 7.5 parts by weight and particularly preferred 1 to 5 parts by weight, of at least one polybutadiene prepared by emulsion polymerisation, having an average particle diameter $d_{50}$ in the latex form of from 80 to 500 nm, preferably from 100 to 450 nm and particularly preferred from 120 to 300 nm and a gel content of from 10 to 95% by weight, preferably from 20 to 80% by weight and particularly preferred from 30 to 60% by weight.

Virtually all rubbers having glass transition temperatures of ≦0° C. are suitable as graft bases for the ABS polymers A and B. Examples are polybutadiene, polyisoprene, styrene-butadiene copolymers, acrylonitrile-butadiene copolymers, acrylic rubbers (optionally with a core-shell structure), EPM rubbers (ethylene-propylene rubbers) and EPDM rubbers (ethylene-propylene-diene rubbers which contain as the diene a non-conjugated diene such as, for example, hexadiene-1,5 or norbornadiene in small quantities). The preferred rubber for preparing the ABS polymers A and B is polybutadiene.

The graft monomers used for the ABS polymers A and B are combinations of at least two monomers selected from styrene, α-methylstyrene, methyl methacrylate, acrylonitrile, N-phenylmaleimide; styrene-acrylonitrile mixtures, α-methylstyrene-acrylonitrile mixtures and styrene-α-methylstyrene-acrylonitrile mixtures are preferred.

The component A to be used according to the invention is known; the preparation thereof is carried out by mass polymerisation or solution polymerisation and is described, for example, in U.S. Pat Nos. 4,012,462, 4,362,850 or EP-A 67 536.

The particles of ABS rubber in component A are at least partly cross-linked and must possess average particle diameters $d_{50}$ (determined by measuring recordings from an electron microscope) of from 800 to 15,000 nm, preferably from 1,000 to 10,000 nm and particularly preferred from 1,200 to 5,000 nm. The rubber content of the ABS polymers are between 1 and 20% by weight, preferably between 5 and 15% by weight and particularly preferred between 7.5 and 12.5% by weight.

The ratio by weight of incorporated styrene and optionally incorporated α-methylstyrene to other incorporated comonomers in component A is preferably from 70:30 to 80:20, particularly preferred from 75:25 to 78:22.

The component B to be used according to the invention is known; the preparation thereof is carried out by radical emulsion polymerisation of the above-mentioned monomers in the presence of a rubber in the form of latex and is described, for example, in EP-A 212 123.

The emulsion particles of ABS rubber in component B are at least partly cross-linked and must possess average particle diameters $d_{50}$ (determined by ultracentrifuge measurement, cf. W. Scholtan, H. Lange in Kolloid-Z. u. Z. Polymere 250, pages 782–796 (1972)) of from 50 to 500 nm, preferably from 100 to 450 nm and particularly preferred from 200 to 400 nm.

The rubber content of component B is between 20 and 80% by weight, preferably from 30 to 70% by weight and particularly preferred from 35 to 65% by weight.

The ratio by weight of incorporated styrene and optionally incorporated α-methylstyrene to other incorporated comonomers in component B is preferably from 70:30 to 80:20, particularly preferred from 71:29 to 74:26.

The thermoplastic vinyl resin component C optionally to be used according to the invention is known; the preparation thereof is carried out by radical polymerisation of the above-mentioned monomers, wherein the synthesis can be performed by emulsion polymerisation, suspension polymerisation, solution polymerisation or mass polymerisation. The two last-named methods are preferred, cf., for example, DE-A 3 334 338 and EP-A 255 889. The molecular weights of the vinyl resin components C are variable within wide limits ($\overline{M}_w$ approximately 50,000 to 150,000); copolymers of styrene and acrylonitrile, of α-methylstyrene and acrylonitrile as well as terpolymers of styrene, α-methylstyrene and acrylonitrile are preferred.

The polybutadiene component D to be used according to the invention is known; the preparation thereof is carried out by the method of emulsion polymerisation (cf., for example, H. Logemann in Houben-Weyl, Methoden der Organischen Chemie, Makromolekulare Stoffe, Part I, page 674 (1961) and the references cited there, Thieme Verlag Stuttgart), whereby it is possible to adjust the required particle diameter $d_{50}$ of from 80 to 500 nm, preferably from 100 to 450 nm and particularly preferred from 120 to 300 nm (measured in each case by ultracentrifuge measurements, cf. above) and the optimal gel content of from 10 to 90% by weight, preferably from 20 to 80% by weight and particularly preferred from 30 to 60% by weight (determined in each case by the wire cage method in toluene, cf. H. Logemann in Houben-Weyl, Methoden der Organischen Chemie, Makromolekulare Stoffe, Part I, page 307 (1961), Thieme Verlag Stuttgart).

The ABS polymer compositions according to the invention can be obtained by mixing together the components thereof A, B, optionally C and D at an elevated temperature, particularly at T=100° C. to 280° C., for example, in kneaders, cylinder mills or screw-type machines.

Conventional additives such as, for example, antioxidants, age-resisters, lubricants, flameproofing agents, fillers, pigments, antistatic agents, can be added in conventional quantities to the compositions.

The compositions according to the invention are thermoplastic moulding materials having good toughness and good thermoplastic flow properties which, through processing by, for example, extrusion, calendering and injection moulding, result in moulded parts possessing a uniform matt surface.

EXAMPLES AND COMPARISON EXAMPLES

Polymers Used having a molecular weight (weight average) $\overline{M}_w$ of approximately 80,000 and a molecular non-uniformity $U=\overline{M}_w/\overline{M}_n-1 \leq 2$.

D1: Polybutadiene (prepared by emulsion polymerisation) having an average particle diameter ($d_{50}$) of 115 nm and a gel content of 93% by weight.

D2: Polybutadiene (prepared by emulsion polymerisation) having an average particle diameter ($d_{50}$) of 280 nm and a gel content of 49% by weight.

D3: Polybutadiene (prepared by emulsion polymerisation) having an average particle diameter ($d_{50}$) of 272 nm and a gel content of 55% by weight.

The components D1 to D3 were not worked up separately but were worked together respectively with part of the component B (ratio by weight of D:B=30:70) and used in this form.

E: Hydrophobic silicic acid.

The quantities of the components A to D shown in Table 1 were mixed together with 2 parts of pentaerythritol tetrastearate in an internal kneader at 180° C. to 200° C. and subsequently processed into standard bars and a plate (for surface assessment) by injection moulding.

The impact value $a_k$ was established in accordance with ISO 180/1A (unit: kJ/m²), the thermoplastic processability by measuring the MVI value in accordance with DIN 53 735U (unit: cm³/10 min) and the surface gloss in accordance with DIN 67 530 against an even plate at an angle of reflection of 60° (reflectometer value).

The resulting values are also summarised in Table 1. From this it may be seen that only the ABS polymer compositions according to the invention possess an optimal combination of good toughness, good processability and very good uniform mattness of the surface of the moulded part.

TABLE 1

Compositions and test data of the ABS polymer compositions prepared

| | Compositions | | | | | | | Test data | | |
|---|---|---|---|---|---|---|---|---|---|---|
| | A | B | C | D1 | D2 | D3 | E | | | |
| Example | pts. by wt. | pts. by wt. | pts. by wt. | pts. by wt. | pts. by wt. | pts. by wt. | pts. by wt. | $a_k$ (kJ/m²) | MVI (cm³/min) | Reflectometer value |
| 1 | 20 | 33.5 | 44 | 2.5 | — | — | — | 21 | 11 | 24 |
| 2 | 50 | 17 | 30 | 3 | — | — | — | 29 | 9 | 11 |
| 3 | 50 | 17 | 30 | — | 3 | — | — | 28 | 10 | 4 |
| 4 | 50 | 17 | 30 | — | — | 3 | — | 30 | 9 | 5 |
| 5 | 35 | 27 | 35 | 3 | — | — | — | 26 | 10 | 13 |
| 6 (comp.) | 100 | — | — | — | — | — | — | 21 | 6.5 | 40 |
| 7 (comp.) | 20 | 36 | 44 | — | — | — | — | 22 | 13 | 42 |
| 8 (comp.) | — | 35 | 64 | — | — | — | 1 | 14 | 10 | 35 |

A: Bulk ABS polymer having rubber particles with an average particle diameter of approximately 1,300 nm and a rubber content of approximately 11% by weight (Magnum 3504, DOW).

B: Emulsion ABS polymer consisting of 55% by weight of polybutadiene having an average particle diameter ($d_{50}$) of 395 nm as a graft foundation, onto which is grafted 45% by weight of a styrene-acrylonitrile mixture (ratio of weights of styrene:acrylonitrile=72:28).

C: Styrene-acrylonitrile copolymer consisting of 72% by weight of styrene and 28% by weight of acrylonitrile

We claim:
1. An ABS polymer composition consisting of:
A) 5 to 80 parts by weight of at least one ABS polymer prepared by mass polymerization or solution polymerization, having rubber particles with a average particle diameter of from 800 to 15,000 nm and a rubber content of from 1 to 20% by weight;
B) 1 to 50 parts by weight of at least one ABS polymer prepared by emulsion polymerization, having a average particle diameter of from 50 to 500 nm and a rubber content of from 20 to 80% by weight;

C) 0 to 70 parts by weight of at least one thermoplastic vinyl resin prepared by radical polymerization of at least two monomer components selected from the group consisting of styrene,α-methylstyrene, methyl methacrylate, acrylonitrile and N-phenylmaleimide; and D) 0.5 to 10 parts by weight of at least one polybutadiene prepared by emulsion polymerization, having a average particle diameter $d_{50}$ in the latex form of from 80 to 500 nm and a gel content of from 10 to 95% by weight.

2. An ABS polymer composition consisting of:

A) 10 to 60 parts by weight of at least one ABS polymer prepared by mass polymerization or solution polymerization, having rubber particles with a average particle diameter of from 1,000 to 10,000 nm and a rubber content of from 5 to 15% by weight;

B) 5 to 40 parts by weight of at least one ABS polymer prepared by emulsion polymerization, having a average particle diameter of from 100 to 450 nm and a rubber content of from 30 to 70% by weight;

C) 5 to 60 parts by weight of at least one thermoplastic vinyl resin prepared by radical polymerization of at least two monomer components selected from the group consisting of styrene, α-methylstyrene, methyl methacrylate, acrylonitrile and N-phenylmaleimide; and D) 0.75 to 7.5 parts by weight of at least one polybutadiene prepared by emulsion polymerization, having a average particle diameter $d_{50}$ in the latex form of from 100 to 450 nm and a gel content of from 20 to 80% by weight.

3. An ABS polymer consisting of:

A) 15 to 55 parts by weight of at least one ABS polymer prepared by mass polymerization or solution polymerization, having rubber particles with a average particle diameter of from 1,200 to 5,000 nm and a rubber content of from 7.5 to 12.5% by weight;

B) 10 to 35 parts by weight of at least one ABS polymer prepared by emulsion polymerization, having a average particle diameter of from 200 to 400 nm and a rubber content of from 35 to 65% by weight;

C) 10 to 50 parts by weight of at least one thermoplastic vinyl resin prepared by radical polymerization of at least two monomer components selected from the group consisting of styrene, α-methylstyrene, methyl methacrylate, acrylonitrile and N-phenylmaleimide; and D) 1 to 5 parts by weight of at least one polybutadiene prepared by emulsion polymerization, having a average particle diameter $d_{50}$ in the latex form of from 120 to 300 nm and a gel content of from 30 to 60% by weight.

* * * * *